(12) United States Patent
Wurzbach et al.

(10) Patent No.: US 8,477,894 B2
(45) Date of Patent: *Jul. 2, 2013

(54) METHOD AND SYSTEM FOR COMMUNICATION CHANNEL CHARACTERIZATION

(75) Inventors: James A. Wurzbach, San Diego, CA (US); Steven E. Shields, San Diego, CA (US); David G. Manzi, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/415,283

(22) Filed: Mar. 8, 2012

(65) Prior Publication Data

US 2012/0170633 A1 Jul. 5, 2012

Related U.S. Application Data

(63) Continuation of application No. 11/627,392, filed on Jan. 26, 2007, now Pat. No. 8,160,189.

(51) Int. Cl.
*H04B 1/10* (2006.01)
*H04L 27/06* (2006.01)
*H03D 1/04* (2006.01)

(52) U.S. Cl.
USPC .......................... 375/350; 375/343; 375/346

(58) Field of Classification Search
USPC ................ 375/142, 143, 147, 150, 260, 262, 375/265, 340, 341, 343, 346, 349, 350, 355
See application file for complete search history.

(56) References Cited

U.S. PATENT DOCUMENTS

| 5,894,494 | A | * | 4/1999 | Davidovici | 375/150 |
|---|---|---|---|---|---|
| 6,128,337 | A | | 10/2000 | Schipper et al. | |
| 2003/0031275 | A1 | | 2/2003 | Min et al. | |
| 2004/0161022 | A1 | * | 8/2004 | Glazko et al. | 375/152 |
| 2005/0180312 | A1 | | 8/2005 | Walton et al. | |
| 2005/0220228 | A1 | | 10/2005 | Trachewsky et al. | |
| 2006/0126573 | A1 | * | 6/2006 | Dick et al. | 370/335 |
| 2006/0222096 | A1 | | 10/2006 | Guo et al. | |

FOREIGN PATENT DOCUMENTS

| EP | 0 729 254 A2 | 8/1996 |
|---|---|---|
| EP | 0 729 254 A3 | 8/1996 |

OTHER PUBLICATIONS

PCT Search Report and Written Opinion of the ISA for PCT/US2007/086763 dated May 6, 2008.
PCT International Preliminary Report on Patentability of the ISA dated Jul. 28, 2009 for PCT/US2007/08673.

* cited by examiner

*Primary Examiner* — Young T. Tse
(74) *Attorney, Agent, or Firm* — Daly, Crowley, Mofford & Durkee, LLP

(57) ABSTRACT

In accordance with the present invention, a method of processing a signal is described that includes receiving a signal having an encoded digital packet, wherein the digital packet includes packet data and a packet frame, wherein the packet frame includes a common digital signal that is common to each one of a plurality of digital packets. The method further includes sampling a signal associated with the received signal to provide a sampled signal. The method further includes performing a channel characterization by contrasting a signal representative of the sampled signal with a signal representative of the common digital signal. A corresponding system is also described.

20 Claims, 6 Drawing Sheets

METHOD AND SYSTEM FOR COMMUNICATION CHANNEL CHARACTERIZATION

CROSS REFERENCE TO RELATED APPLICATIONS

This application a Continuation Application of and claims the benefit of U.S. patent application Ser. No. 11/627,392, filed on Jan. 26, 2007, which is incorporated herein by reference in its entirety.

FIELD OF THE INVENTION

This invention relates generally to data communications and, more particularly, to a method and system for data channel characterization used in data communications.

BACKGROUND OF THE INVENTION

It is known that transmission of a digital signal through a medium, whether wired or wireless, can result in the digital signal becoming distorted due to affects of the medium. Digital signals transmitted though a wireless medium (i.e., wireless signals) can be distorted due to effects of multipath fading, magnitude response, and phase response of the wireless medium. Digital signals transmitted though a wire medium (i.e., wired signals) can also be distorted due to effects of magnitude response and phase response of the wired medium. Distortion of a digital signal can lead to loss of data, or data that is not properly interpreted by a receiver of the digital signal.

A variety of methods of signal coding have been developed to address the above issues, particularly for wireless media. To be successful, however, most of these methods require prior knowledge of the medium fading and attenuation characteristics. In static situations, where the medium (i.e., channel) does not change with respect to time (e.g., a wired channel or a static wireless channel), a pre-characterization, in which characteristics of the channel are measured before a transmission of data, is sufficient to characterize the channel. Channel fading and attenuation effects can be measured in the pre-characterization, and corrections can be used to compensate at a receiving system.

However, in many practical applications, channel characteristics vary with respect to time. For example, a wireless transmitter or a wireless receiver can be moving, resulting in a changing communication channel. In these cases, some form of dynamic channel characterization is required to characterize the channel as it changes over time.

A common approach for performing the dynamic channel characterization is to incorporate one or more reference or calibration signals into a digital signal being transmitted in a communication. The calibration signals are often referred to as pilot tones, or pilot symbols. The format and content of the pilot tones are predetermined, and therefore, known at the receiver. When the pilot tones are detected at the receiver, any one of various algorithms can be used in order to derive a desired channel compensation by a comparison of characteristics of the known pilot tones to characteristics of the received pilot tones. For example, the amplitude and a phase of the pilot tones can be used for comparison.

A disadvantage of using pilot tones is that the pilot tones carry no data. Therefore, use of the pilot tones results in a loss of channel bandwidth that could otherwise be used for data transmission. The loss of bandwidth is exacerbated if the channel changes rapidly, wherein the pilot tones must be transmitted more often in order to dynamically update the channel characteristics used by the receiver for compensation.

To be of general utility in a practical environment, wireless communications, and in particular, wireless digital communications, must be robust in a variety of static and dynamic applications having multipath fading, attenuation, and other losses that degrade a transmitted digital signal as it propagates through a wireless medium to a receiver. The office environment typifies a somewhat static environment. In the office, the office occupants move about, but the principal sources of multipath reflections, such as furniture and walls, are generally fixed in place. Therefore, a wireless communication channel in an office environment can have relatively constant channel characteristics.

In contrast, mobile users, such as pedestrians and motorists in an urban setting, represent dynamic situations in which the characteristics (i.e., magnitude and phase response) of a communication channel change greatly and sometimes rapidly. In the case of the motorist using, for example, a cellular telephone, changes to characteristics of the wireless channel (or medium) occur very rapidly in the presence of movement, which can correspond to movement of several wavelengths in as little as 10 ms. The communication channel used by the motorist needs frequent characterizations using a multiplicity of pilot symbols. For the pedestrian using, for example, a cellular telephone, changes to characteristics of the wireless medium occur less rapidly and characterization of the channel are needed less often.

A ship, and especially a military ship, represents a unique and particularly challenging environment in which a wireless signal must propagate through a communication channel comprised of Faraday cages, i.e., all-metal compartments. Furthermore, reflective surfaces within the compartments are subject to movement. For example, airplanes and equipment in the hanger deck of an aircraft carrier are frequently moved over distances much greater than a wavelength of the wireless signal. Helmets, vehicles, and landing craft in the loading area, i.e., the well deck, of an amphibious landing ship, also move about the ship. Within the challenging shipboard environment, channel characteristics are subject to dynamic change at rapid rates.

Numerous coding approaches have been developed to maintain signal quality in the presence of multipath fading, attenuation, and other losses. However, most of these methods require prior knowledge of channel characteristics to optimally reconstruct and decode the received signal. This can be an issue in situations where channel characteristics are changing rapidly.

Space-time coding, known to those of ordinary skill in the art, is an example of one of the many forms of signal coding techniques used to achieve diversity gain (e.g., multiple channels) to operate in the presence of multipath fading, attenuation, and other problems. However, most forms of space-time coding require knowledge of channel characteristics.

Block coding, also known to those of ordinary skill in the art, is a computationally straightforward method using space-time coding. Block coding also requires knowledge of channel characteristics.

In order to obtain the knowledge of channel characteristics, a method of characterization of a communication channel is needed. For static cases, such as the typical office environment, measurement of characteristics (e.g., frequency response and phase response) of the channel prior to use may be sufficient. For dynamic cases, where channel characteristics change with respect to time, frequent measurement of the channel characteristics is necessary.

As described above, pilot tones embedded in a digital data stream can be used to provide the dynamic channel characterization, but at the expense of channel bandwidth. Some examples of conventional pilot tones include:

pilot tones described in IEEE 802.11; and pilot tones transmitted at the same time as the data, but at a different frequency, for example, pilot tones transmitted in the sub-channels of OFDM (orthogonal frequency division multiplexing).

Methods for measuring communication channel characteristics from transmitted pilot tones generally fall into three categories: correlation, Best Linear Unbiased Estimator (BLUE), or Minimum Mean Square Error (MMSE). Computational complexity increases from correlation to BLUE to MMSE.

Correlation provides a direct comparison of a received pilot tone signal to an expected pilot tone signal, using correlation techniques. The expected pilot tone signal is a version of the pilot tone signal that would be expected to be received if it propagated through a perfect communication channel, i.e., a communication channel having no multipath, a flat magnitude response and a zero phase response. Correlation is the most computationally straightforward of the three methods, but it is also the most sensitive to noise.

The BLUE method convolves the expected pilot tone signal with an estimate of the channel response, compares that result with the received pilot signal, and computes the difference between the two. The BLUE method then identifies the channel response that minimizes the mean square error between the expected pilot tone signal and the received pilot tone signal. This approach is more computationally intensive than correlation, in that a matrix, which incorporates the pilot data, must be inverted.

The MMSE method has elements in common with correlation and BLUE. Like BLUE, MMSE minimizes the mean square error between an expected pilot tone signal and a received pilot tone signal, and it also involves a matrix inversion. In addition, the noise power must be known at the receiver. At each channel estimation, the matrix must be reconstructed with the present noise power, requiring an additional complication. At high signal-to-noise ratios, MMSE resembles BLUE, but at low signal-to-noise ratios, MMSE resembles correlation.

Some channel characterization methods do not require as many pilot tones, or none at all. These methods are known as semi-blind and blind techniques, respectively.

Semi-blind techniques take advantage of feedback from a receiver. Turbo channel estimation and subspace-based methods are among the semi-blind approaches. Turbo channel estimation begins with a training set of pilot symbols, and then improves the channel estimation in succeeding iterations. Subspace-based methods invoke temporal correlations between consecutive data sets. All of these methods are effective at reducing the number of pilot tones that must be processed to achieve reliable channel characteristic estimation.

Blind techniques can eliminate use of pilot tones altogether. These methods fall into two categories: those based on Second Order Cyclostationary Statistics (SOCS) and those based on Higher Order Statistics (HOS). The SOCS technique requires the system to be stationary for a limited time period, and HOS requires signals at the receiver to be statistically independent. Therefore, SOCS may not be applicable to systems that are changing rapidly, and in general, HOS will not be readily applicable to MIMO (Multiple Input/Multiple Output) channels that have been Space-Time coded, because the coded signals are not statistically independent.

It would, therefore, be desirable to have a channel characterization method and system that can characterize a communication channel during a communication with minimum loss of channel bandwidth, and which can be used to identify channel characteristics for a communication channel that has dynamically changing characteristics.

SUMMARY OF THE INVENTION

The present invention provides a channel characterization system and method that can identify communication channel characteristics (i.e., magnitude and phase response) with minimum loss of channel bandwidth, and which can be used to identify channel characteristics for a channel with dynamically changing characteristics. The identified channel characteristic can be used to dynamically adjust a receiver to compensate for the identified channel characteristics.

In accordance with the present invention, a method of processing a signal to provide a channel characterization includes receiving a signal having an encoded digital packet, wherein the digital packet includes packet data and a packet frame, wherein the packet frame includes a common digital signal that is common to each one of a plurality of digital packets. The method further includes sampling a signal associated with the received signal to provide a sampled signal. The method further includes performing a channel characterization by contrasting a signal representative of the sampled signal with a signal representative of the common digital signal.

In some arrangements, the method further includes adapting at least one of a pre-filter or a post-filter in accordance with the channel characterization.

In accordance with another aspect of the present invention, a system for processing a signal to provide a channel characterization includes a receiving circuit configured to receive a signal having an encoded digital packet, wherein the digital packet includes packet data and a packet frame, wherein the packet frame includes a common digital signal that is common to each one of a plurality of digital packets. The system further includes a sampling circuit coupled to the receiving circuit, wherein the sampling circuit is configured to generate a sampled signal associated with the received signal. The system further includes a contrasting processor coupled to the sampling circuit and configured to perform a channel characterization by contrasting a signal representative of the sampled signal with a signal representative of the common digital signal.

In some arrangements, the system further includes at least one of a pre-filter or a post-filter, which are adapted in accordance with the channel characterization.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained. As used herein, the term "replica correlation" is used to describe a correlation of a signal with a "replica signal." The term "replica signal" is used herein to describe a predetermined signal that is representative of a predetermined portion of a perfect received signal, i.e., a received signal that has not experienced any affect from a propagation channel. It will be understood that when the replica signal aligns in time during the replica correlation with the predetermined portion of a received signal, an output of the replica correlation has a high value, indicative of a signal match.

As used herein, the term "common digital signal" or simply "common signal" refers to a digital pattern of bits that occurs in each one of a plurality of digital packets, or in a large number of the digital packets.

While some examples of systems and methods used to characterize and to compensate wireless communication channels are described below, it should be appreciated that the same or similar techniques can be used to characterize and to compensate wired communication channels. The same or similar techniques can also be used to characterize and to compensate optical communication channels using laser propagation through the air or through optical fibers.

While a particular digital packet having particular packet structures and having particular common signals are described below, it should be appreciated that the same or similar techniques can be applied to other digital packets having other packet structures and other common signals.

Figure 1:
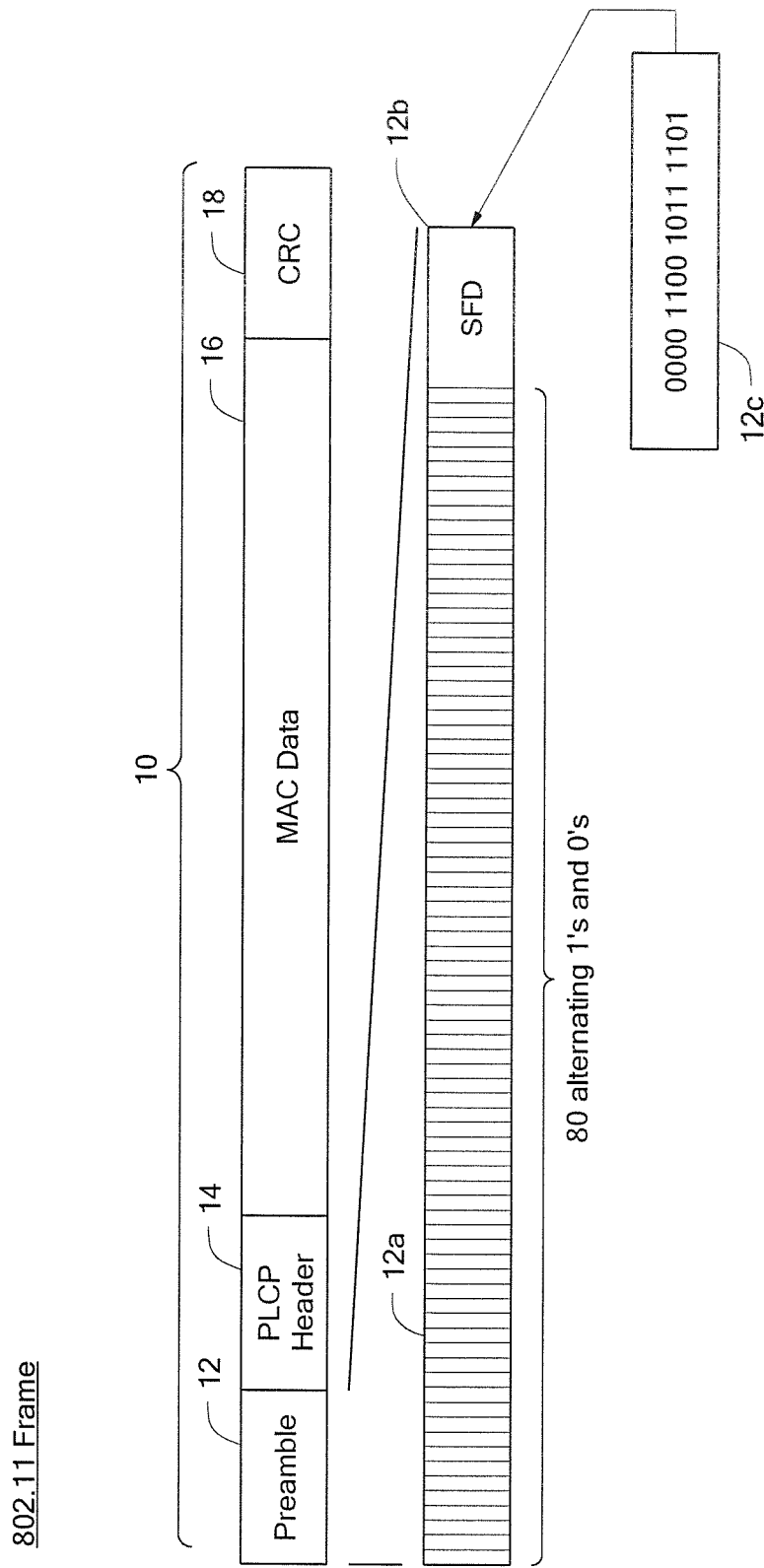
FIG. 1 is a diagram showing a digital packet having packet data and a packet frame.

Referring to FIG. 1, a digital packet 10 in accordance with the Institute of Electrical and Electronics Engineers (IEEE) 802.11 standard, includes a packet frame having a preamble 12, a Physical Layer Convergence Protocol (PLCP) header 14, and a cyclic redundancy code (CRC) 18. The digital packet 10 also includes Medium Access Control (MAC) data 16. The MAC data 16 includes the actual data being conveyed in the digital packet 10.

The preamble 12 includes a portion 12a having a string of eighty alternating ones and zeros and also a start frame delimiter (SFD) 12b. The SFD 12b includes a string of sixteen bits 12c that can be arranged as a pseudo-random code of ones and zeros.

It will be understood that the pseudo random code has a property that when it is subjected to an autocorrelation (and also replica correlation), the output of the correlation has a high discrimination. In other words, for one particular time delay used in the correlation, the output of the correlation is high, indicating a strong correlation, and for all other time delays used in the correlation, the output of the correlation is low, indicating low correlation.

It will be recognized that there are several portions (i.e. digital signals) within the digital packet 10 that are common to all such digital packets. The portion 12a and the SFD 12b are common to all such digital packets. The digital packet 10 can also include a frame/protocol type identifier, for example, within a frame protocol field (not shown) within the MAC data 16. The frame/protocol type identifier is common to all such digital packets having the same frame type and the same protocol type. The digital packet 10 can also include address data, for example, an Internet protocol (IP) source address, an IP destination address, a MAC source address, and/or a MAC destination address for example, within the MAC Data 16. The various addresses (not shown) can be common to all such digital packets in static situations, where communications are occurring between communication systems having fixed addresses.

It will become apparent from discussion below that the present invention can measure or characterize a communication channel, wired or wireless, by using one or more common digital signals within the digital packet 10, which do not change from digital packet to digital packet, or which change infrequently. The common digital signal(s) can take the place of the above-described pilot tones, which are embedded into the digital packet in some prior art systems, and in particular embedded in the MAC data 16, taking up bandwidth.

Being part of the native structure of the digital packet 10, the use of the common digital signal(s) uses no additional bandwidth. Furthermore, the channel characterization and compensation can be updated as often as needed, including continuous channel characterization. As used herein, the term "continuous channel characterization" refers to a characterization for which compensation is performed upon each digital packet (or nearly all digital packets) that is received.

Figure 2:
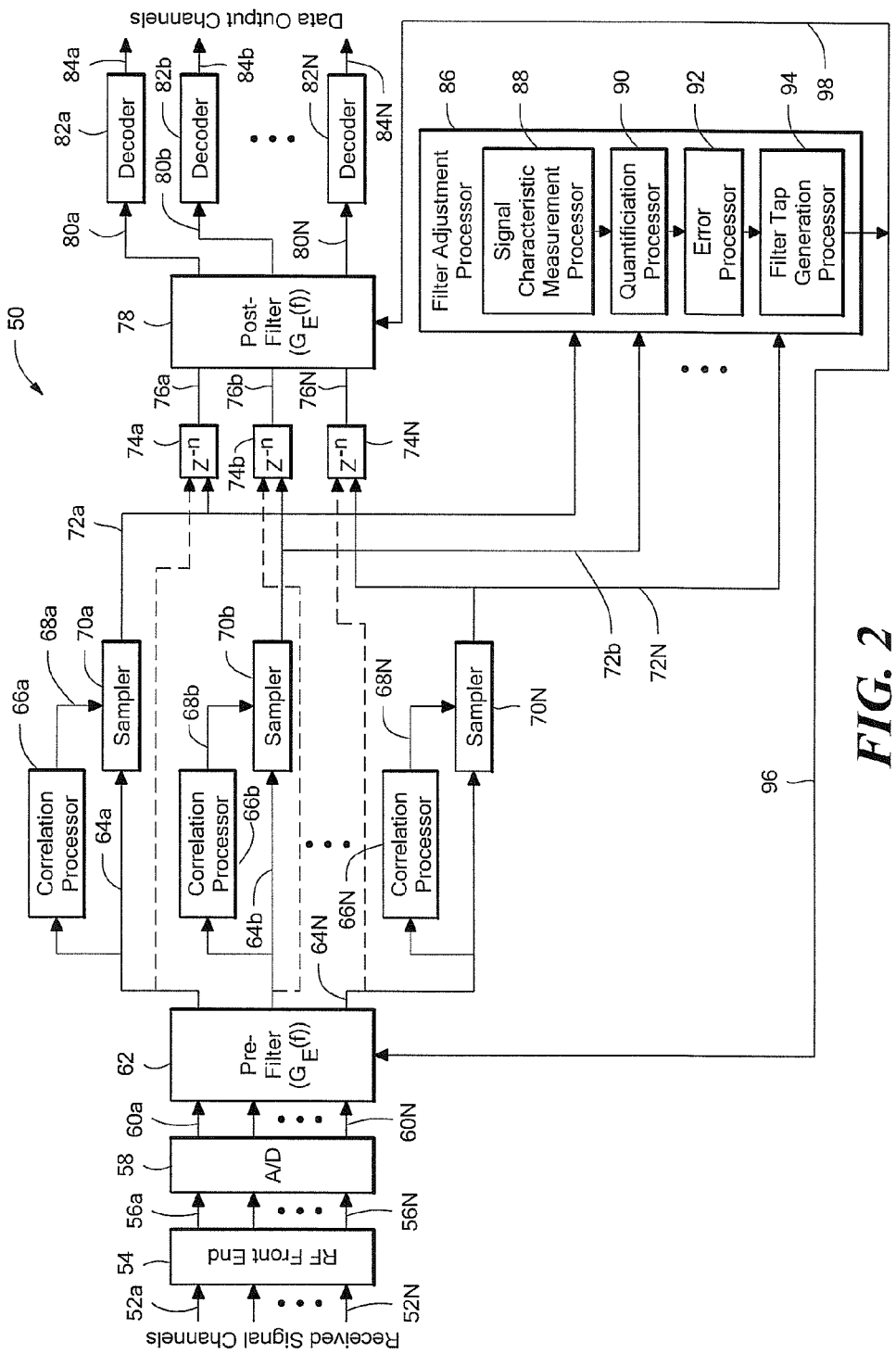
FIG. 2 is a block diagram showing a system for data channel characterization in accordance with the present invention.

Referring now to FIG. 2, an exemplary system 50 for communication channel characterization is adapted to receive one or more RF signals 52a-52N. The RF signals 52a-52N can be provided, for example, by separate antennas that receive corresponding wireless signals, providing space diversity or space-time diversity. The RF signals 52a-52N can have the same digital packets embedded therein or they can have different digital packets (e.g., for space-time diversity). Furthermore, the RF signals 52a-52N can have the same carrier frequency and encoding, or they can have different carrier frequencies and encodings.

Regardless of whether the RF signals 52a-52N have the same or different digital packets embedded therein and regardless of whether the RF signals 52a-52N have the same or different carrier frequencies and encodings, the elements and processing of the RF signals 52a-52N are similar and it will be understood from discussion below how to use or modify the systems and methods described herein to accommodate RF signals 52a-52N having different digital packets and/or having different carrier frequencies or encodings.

The RF signals 52a-52N can each be associated with wireless signals that have propagated on different propagation paths, or on substantially the same propagation path. Signals that have propagated on different propagation paths may have experienced different channel affects, which may result in different measured channel characterizations and different desired channel compensations. Regardless of whether the wireless signal resulting in the RF signals 52a-52N have propagated on different propagation paths or on substantially the same propagation path, the elements and processing of the RF signals 52a-52N are similar and it will be understood from discussion below how to use or modify the systems and methods described herein to accommodate RF signals 52a-52N associated with wireless signals that have propagate on different propagation paths, and which require different channel characterizations and compensations.

The RF signals 52a-52N are received by a radio frequency (RF) front end module 54. The RF front end module 54 can, for example, amplify and down-convert the received RF signals 52a-52N, providing down-converted signals 56a-56N, respectively. In accordance with discussion above, the down-conversions provided by the RF front end 54 to each one to the RF signals 52a-52N can be the same or different down conversions.

The RF signals 52a-52N and the down-converted signal 56a-56N can be analog signals. In some embodiments, the down-converted signals 56a-56N are intermediate frequency (IF) signals. In other embodiments, the down-converted signals 56a-56N are baseband signals, for example, signals for which digital bits arranged in digital packets are encoded in a phase shift keyed (PSK) technique.

In some arrangements, the digital packets associated with each of the received RF signals 52a-52N and associated with each of the down-converted signals 56a-56N can have a format according to the digital packet 10 of FIG. 1.

The down-converted signals 56a-56N are sampled by an analog to digital (A/D) converter 58, to provide sampled signals 60a-60N. The sampled signals 60a-60N are received by and filtered by a pre-filter 62, providing pre-filtered signals 64a-64N, respectively. The pre-filter 62 can be a digital filter, for example a multi-channel infinite impulse response (IIR) filter. In other embodiments, the pre-filter 62 can be a multi-channel finite impulse response (FIR) filter.

As is known, a digital filter has a magnitude and phase response determined by a number of taps (delays) and by tap weight values 96 (scaling values) associated with each of the taps. The pre-filter 62 has an adjustable (i.e., adaptable) magnitude and phase response, adjustable by way of the tap weight values 96.

In operation, the pre-filter 62 can apply to the sampled signals 60a-60N at least part of a desired magnitude response and at least part of a desired phase response essentially opposite to (i.e., compensating) the magnitude and phase response imparted on the RF signal 52a-52N by the wireless links through which the wireless signals propagate before arriving at the RF front end 54. Another part of the desired magnitude and phase response can be applied by a post-filter 78 described more fully below.

In some arrangements, the pre-filter 62 can apply the same frequency and phase response to each one of the sampled signals 60a-60N. However, in accordance with discussion above, in other arrangements, the pre-filter 62 can apply different magnitude and/or phase responses to the sampled signals 60a-60N. In particular, it will be recognized from discussion above, that each one of the sampled signals 60a-60N may be associated with a wireless signal that has traveled on a different propagation path (wireless channel), and therefore, the pre-filter 62, in order to compensate for different magnitude and phase responses of the different wireless channels can apply different magnitude and phase responses to each one of the sampled signals 60a-60N.

Taking the pre-filtered signal 64a as representative of the other pre-filtered signals 64b-64N, the pre-filtered signal 64a is received by a correlation processor 66a, which performs a replica correlation on the pre-filtered signal 64a using a replica signal (not shown). The correlation processor 66a correlates the pre-filtered signal 64a, which is a signal representative of the received signal 52a, with the replica signal. The replica signal can be stored in a solid state memory (not shown) in advance of the replica correlation, and can be provided to the correlation processor 66a. In some arrangements, the replica signal has predetermined and fixed characteristics. In other embodiments, the replica signal has dynamic characteristics, and can be changed in accordance with one or more of a variety of factors, including, but not limited to, a bit rate of the digital packets within the received RF signals 52a-52N, a time of day, or a change of format of the digital packets within the received RF signals 52a-52N (e.g., and address change).

The replica signal can be representative of one or more of a variety of common digital signals, i.e., digital bit patterns that appear in each of the digital packets or in most of the digital packets, but having a format or structure in accordance with the pre-filtered signal 64a (i.e., IF or baseband), which contains the digital packets. For example, for embodiments in which the down-converted signal 56a is an IF signal and the sample signal 60a and the pre-filtered signal 64a are representative of the IF signal, the replica signal (not shown) can include samples of a pre-filtered IF signal representative of a common digital signal within a digital packet. For embodiments in which the down-converted signal 56a is a baseband signal and the sampled signal 60 and the pre-filtered signal 64a are representative of the baseband signal, the replica signal (not shown) can include pre-filtered samples of a baseband signal representative of the common digital signal within a digital packet.

In some embodiments, the common digital signal within the digital packet represented by the replica signal is representative of an SFD of the digital packet, e.g., the SFD 12b, 12c of FIG. 1. In other embodiments, the common digital signal within of the digital packet represented by the replica signal is representative of a string of alternating ones and zeros, for example, eighty ones and zeros representative of the portion 12a of the digital packet 10 of FIG. 1. In other embodiments, the common digital signal within the digital packet represented by the replica signal is representative of an address (e.g., a MAC or IP address) of the digital packet. In still other embodiments, the common digital signal within the digital packet represented by the replica signal is representative of a frame/protocol type identifier (data) associated with the digital packet.

The replica correlation performed by the correlation processor 66a provides a timing signal 68a. The timing signal 68a changes state when the output of the replica correlation has a large value, i.e., when the replica signal aligns in time during the replica correlation with a selected common digital signal within the digital packet that the replica signal is expected to match.

The pre-filtered signal 64a is re-sampled by a sampler 70a, in timing alignment with the timing signal 68a, providing a re-sampled signal 72a. The re-sampled signal 72a is received by time delay/storage module 74a. In some embodiments, the time delay/storage module 74a can accept and essentially store an entire re-sampled signal 72a, representative of an entire digital packet in the received signal 52a. As described above, the re-sampled signal 72a can be representative of a sampled IF signal or of a sampled baseband signal, having digital packets encoded therein. In other arrangements, typified by dashed lines, the time delay/storage modules 74a-74N receive the pre-filtered signals 64a-64N in place of the re-sampled signals 74a-74N.

The time delay/storage modules 74a-74N provides time delayed signal 76a-76N, respectively, to the post-filter 78. As described above, like the pre-filter 62, the post-filter 78 can be a digital filter, for example a multi-channel infinite impulse response (IIR) filter. In other embodiments, the post-filter 78 can be a multi-channel finite impulse response (FIR) filter. The post-filter 78 provides an adjustable magnitude and phase response, adjustable by way of tap weight values 98. Like the pre-filter, 62, the post-filter 78 can apply the same filtering to the time delayed signals 76a-76N or different filtering.

In some embodiments, the pre-filter 62 and the post-filter 78 are the same type of filter and provide the same magnitude and frequency responses. In other embodiments, the pre-filter 62 and the post-filter 78 are different filters having different magnitude and phase responses. However, when the magnitude and phase response of the pre-filter 62 is combined with the magnitude and phase response of the post filter 78, the combined response should compensate for the magnitude and phase response imparted on the RF signals 52a-52N by the wireless communication channel through which wireless signals representative of the RF signals 52a-52N propagate before arriving at the RF front end 54.

In operation, the post-filter 78 can apply to the re-sampled signals 72a-72N at least part of a desired magnitude response and at least part of a desired phase response essentially opposite to (i.e., compensating) the magnitude and phase response imparted on the RF signal 52a-52N by the wireless communication path through which the RF signals 52a-52N propagate before arriving at the RF front end 54. As described above, another part of the desired magnitude and phase response can be applied by a pre-filter 62.

The post-filter 78 provides post-filtered signals 80a-80N, which are received by decoders 82a-82N, respectively. The decoders 82a-82N convert the post-filtered signals 80a-80N, which are digital signals, to digital signals 84a-84N.

The re-sampled signals 72a-72N are also received by a filter adjustment processor 86. The filter adjustment processor 86 is adapted to process the re-sampled signals 72a-72N and to generate tap weight values 96, 98 accordingly. The tap weight values 96, 98 can be the same tap weight values or they can be different tap weight values.

The filter adjustment processor 86 includes a signal characteristic measurement processor 88, which is adapted to measure a predetermined characteristic in one or more of the re-sampled signals 72a-72N.

For example, the signal characteristic measurement processor 88 can measure a power spectrum of the re-sampled signal 72a. The power spectrum can be computed from the entire re-sampled signal 72a or only from a portion of the re-sampled signal 72a. For example, in some embodiments, the signal characteristic measurement processor 88 can measure a power spectrum of only an SFD (see SFD 12b, 12c of FIG. 1) portion of the re-sampled signal 72a. Since in the IEEE 802.11 format, the SFD is a pseudo random code, it will be understood that a power spectrum of the SFD has a shape represented by a sin x/x function.

As another example, in some embodiments, the signal characteristic measurement processor 88 can measure a power spectrum of only the portion 12a (FIG. 1) of a preamble 12 (FIG. 1) of a digital packet 10 (FIG. 1). Since in the IEEE 802.11 format, the portion 12a is a repeating pattern of eighty ones and zeroes, it will be understood that a power spectrum of the portion 12a has harmonically related spectral lines and has an envelope comprising a sin x/x function.

In other embodiments, power spectra of an address or of a frame/protocol type identifier within a digital packet can be used. In still other embodiments, other characteristics of the re-sampled signal 72a can be measured. For example, an edge rate of the digital packer within the re-sampled signal 72a can be measured and quantified. Other signal characteristics that can be used include, but are not limited to, direct measurement of inter-symbol interference in the digitized signal and temporal measurements of correlation parameters (multiple correlation peaks).

While discussion herein describes calculation of a signal characteristic associated with only one of the re-sampled signals 72a-72N, it should be appreciated that a signal characteristic of each of the re-sampled signals 72a-72N can be similarly measured, either separately or in combination. Therefore, only processing of the re-sampled signal 72a is described.

A quantification processor 90 can receive the measured signal characteristic (e.g., power spectrum) and can quantify an aspect of the signal characteristic. For example, the quantification processor 90 can quantify a shape of the power spectrum. Quantification of a shape of a power spectrum can be done in a variety of ways. For example, in one embodiment, the quantified shape can be a ratio of power in the sin x/x sidebands on one side of a main lobe of the measured power spectrum to power in the sin x/x sidebands on the other side of the main lobe.

The quantified aspect of the measured signal characteristic received by an error processor 92, which compares the quantified aspect to a corresponding expected quantified aspect of the measured signal characteristic, which is predetermined. The error processor 92 can generate an error value, for example, a mean square error value. However, in other embodiments, the error processor 92 can generate other error values.

It should be understood that the error processor 92 can generate a separate error value for each one of the re-sampled signals 72a-72N. However, in other embodiments, the separate error values can be combined to provide one error value, for example, an error value computed as an average or a mean square combination of the separate error values.

The error value(s) is provided to a filter tap processor 94, which generates filter weight values 96, 98 in response to the error values(s). For example, if the error value(s) is associated with a shape of a power spectrum being an incorrect shape, quantified by the error value(s), the tap weight values can move (i.e., adapt) a magnitude response and/or a phase response of the pre-filter 62 and/or the post-filter 78 in order to reduce the error value(s) when measured again in conjunction with a next digital packet.

The filter tap processor 94 can use a variety of algorithms in order to reduce the error value(s). In one particular embodiment, the filter tap processor 94 uses a trial and error algorithm. In another embodiment, the filter tap processor 94 uses any number of zero-forcing equalization routines. In another embodiment, the filter tap processor 94 uses adaptive mean square error equalization routines. Mean Square Error equalization routines are preferred in wireless communications since they are more targeted at channels with additive noise than zero-forcing equalization routines.

When the tap weight values 96, 98 are properly selected, the re-sampled signals 72a-72N will have respective quantified signal aspects (e.g., power spectrum shapes) in accordance with those expected. When this is achieved, the decoded signals 84a-84N have a high likelihood of properly representing the digital packets as originally transmitted through the wireless channels.

In some alternate embodiments, either the pre-filter 62 or the post-filter 78 is omitted. For embodiments in which the pre-filter is omitted, the sampled signals 60a-60N are used by the correlation processors 66a-66N. For these embodiments, the correlation processors 66a-66N do not achieve the benefit of having the pre-filter 62, but they may operate satisfactorily. For these embodiments, the above-described replica signal (not shown) can include samples of a sampled IF signal representative of a common signal within a digital packet. The data 84a-84N is equalized by way of the post-filter 78 alone.

For embodiments in which the post-filter 78 is omitted, the correlation processors 66a-66N and the data 84a-84N both achieve the benefit of the pre-filter 62. For these embodiments, as described above, the replica signal (not shown) can include samples of pre-filtered IF signal representative of a common digital signal within a digital packet. The data 84a-84N is equalized by way of the pre-filter 62 alone.

While the pre-filter 62 or the post-filter 78 may be omitted in some above-described embodiments, in those embodiments, a fixed pre-filter or a fixed post-filter may still be used, which has no filter tap adjustment (i.e., no adaptation). For such embodiments, the fixed pre-filter or the fixed post-filter can be digital filters or, alternatively, analog filters placed at other (analog) places in the signal paths.

Figure 2A:
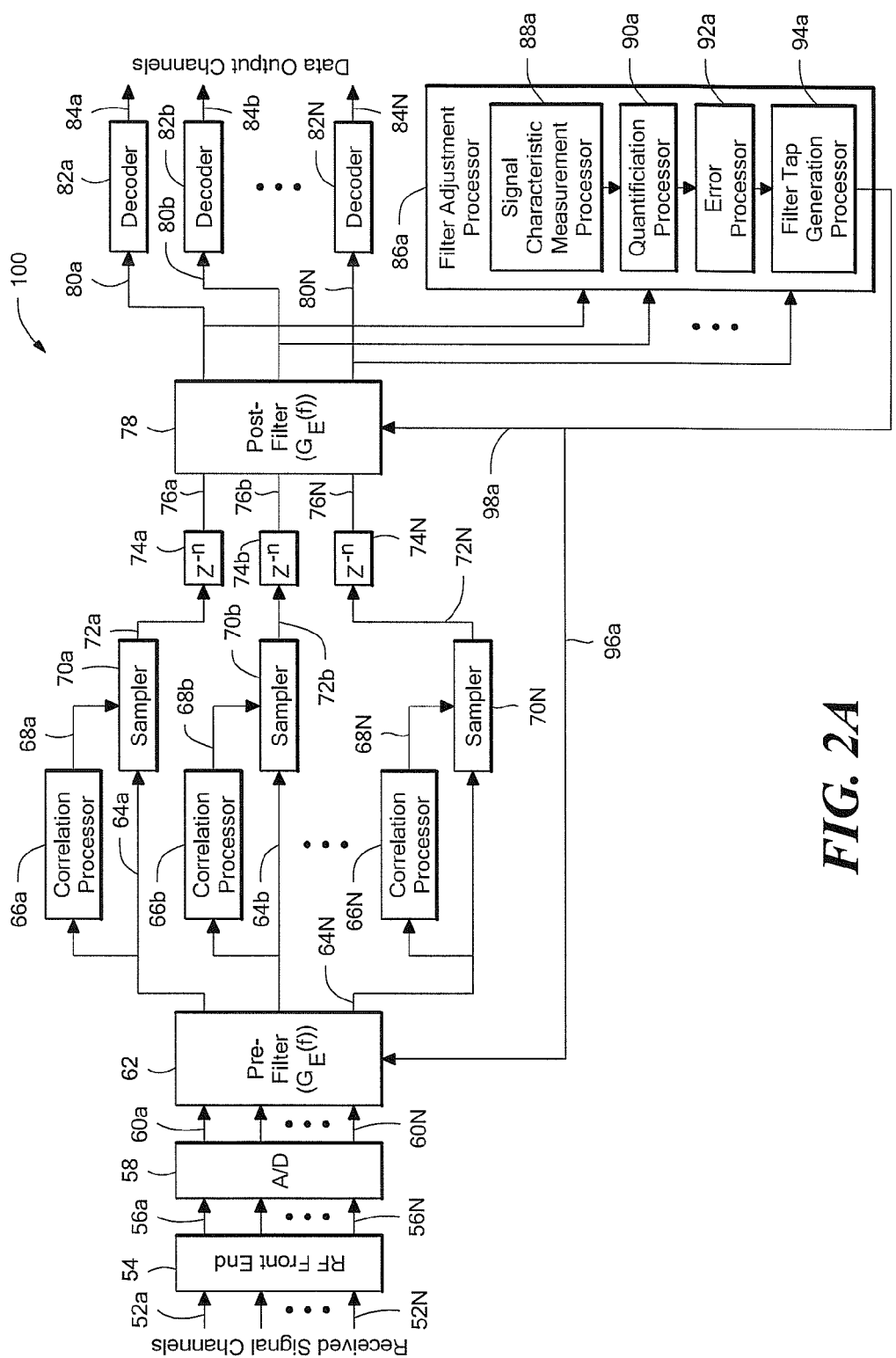
FIG. 2A is a block diagram showing an alternate arrangement of a system for data channel characterization.

Referring now to FIG. 2A, in which like elements of FIG. 2 are shown having like reference designations, an alternate system 100 for communication channel characterization is similar to the system 50 of FIG. 2. However, in the system 100, an alternate filter adjustment processor 86a has inputs coupled to different points of the system 100 than the filter adjustment processor 86 of the system 50 of FIG. 2. The alternate filter adjustment processor 86a is adapted to receive the post-filtered signals 80a-80N. The alternate filter adjustment processor 86a includes a signal characteristic processor 88a, coupled to a quantification processor 90a, coupled to an error processor 92a, coupled to a filter tap generation processor 94a, which can be the same as or similar to the signal characteristic processor 88, the quantification processor 90, the error processor 92, and the filter tap generation processor 94, respectively, of FIG. 2.

Operation of the system 100 is similar to operation of the system 50 of FIG. 2, and therefore, is not further described herein.

Figure 2B:
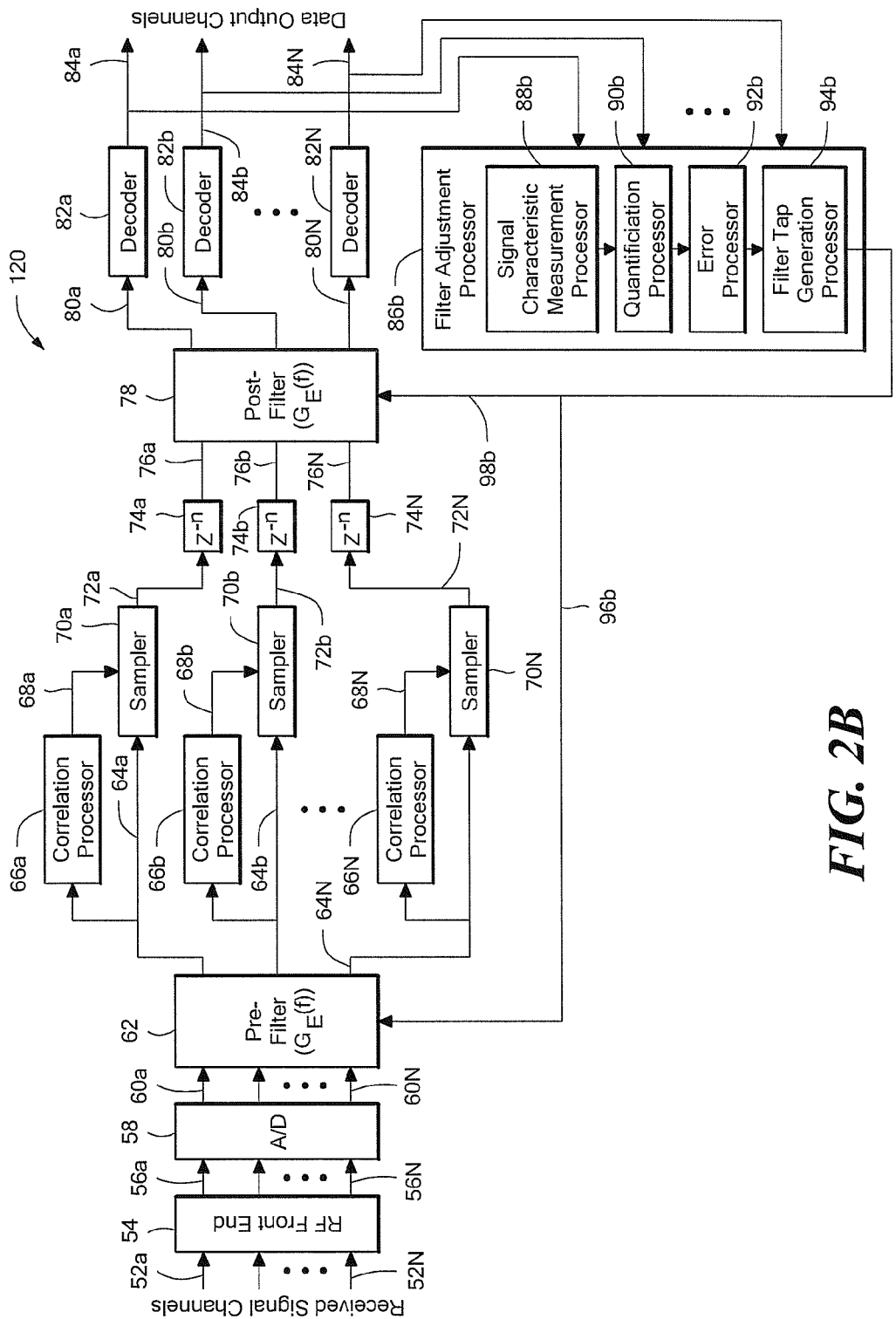
FIG. 2B is a block diagram showing another alternate arrangement of a system for data channel characterization

Referring now to FIG. 2B, in which like elements of FIG. 2 are shown having like reference designations, another alternate system 120 for communication channel characterization is similar to the system 50 of FIG. 2. However, in the system 120, another alternate filter adjustment processor 86b has inputs coupled to other different points of the system 120 than the filter adjustment processor 86 of the system 50 of FIG. 2. The alternate filter adjustment processor 86b is adapted to receive the decoded signals 84a-84N. The alternate filter adjustment processor 86b includes a signal characteristic processor 88b, coupled to a quantification processor 90b, coupled to an error processor 92b, coupled to a filter tap generation processor 94b, which can be the same as or similar to the signal characteristic processor 88, the quantification processor 90, the error processor 92, and the filter tap generation processor 94, respectively, of FIG. 2.

Operation of the system 120 is similar to operation of the system 50 of FIG. 2, and therefore, is not further described herein.

Figure 3:
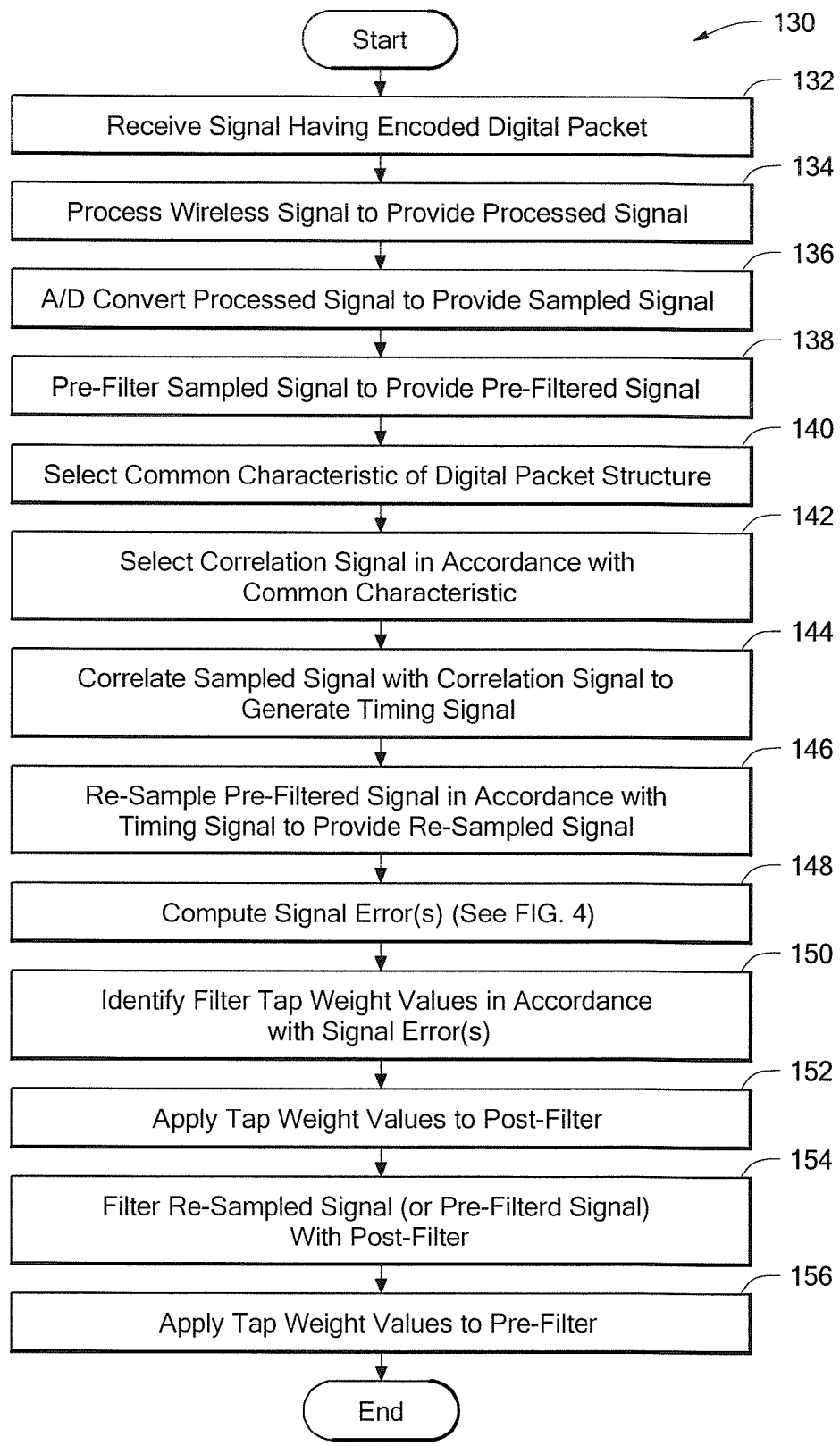
FIG. 3 is a flow chart showing a method of data channel characterization.
Figure 4:
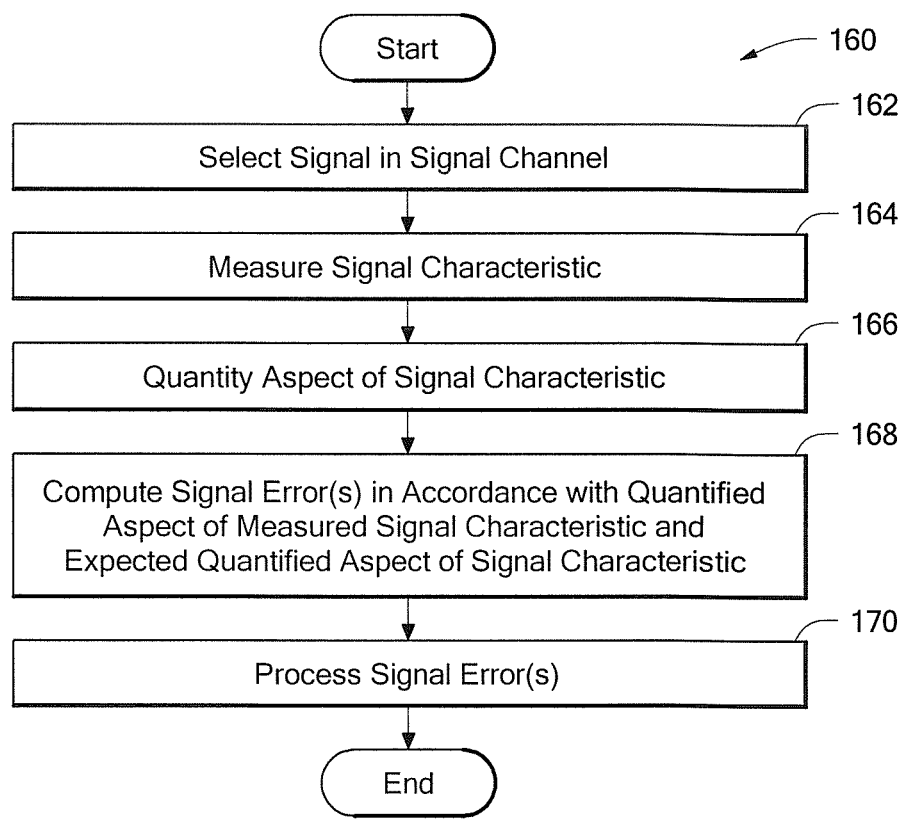
FIG. 4 is a flow chart showing further details of the method of FIG. 3.

It should be appreciated that FIGS. 3 and 4 show flowcharts corresponding to the below contemplated technique which can be implemented in computer system 50 (FIG. 2). Rectangular elements (typified by element 132 in FIG. 3), herein denoted "processing blocks," represent computer software instructions or groups of instructions.

Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring to FIG. 3, a method 130 of data channel characterization begins at block 132, where a signal is received having an encoded digital packet therein. The received signal can be a wired or a wireless signal. At block 134, the received signal is processed to provide a processed signal (e.g., a down-converted signal 56a, FIG. 2), for example, by the RF front end module 54 of FIG. 2.

At block 136, the processed signal is sampled with an A/D converter, for example, with the A/D converter 58 of FIG. 2, to provide a sampled signal (e.g., 60a, FIG. 2). At block 138, the sampled signal is pre-filtered, for example, by the pre-filter 62 of FIG. 2 to provide a pre-filtered signal (e.g., 64a, FIG. 2).

At block 140, a common characteristic of the digital packet is selected. The common characteristic can be one or more of a variety of common characteristics described more fully above.

At block 142, a correlation signal (or replica signal) is selected in accordance with the common characteristic. The replica signal can be representative of an IF signal having a digital packet with the common characteristic or a baseband signal having a digital packet with the common characteristic.

At block 144, the correlation signal (or replica signal) is correlated with the pre-filtered signal, for example by the correlation processor 66a of FIG. 2, to generate a timing signal (e.g., 68a of FIG. 2).

At block 146, the pre-filtered signal of block 138 is re-sampled, for example, by the sampler 70a of FIG. 2, in accordance with the timing signal generated at block 144, to provide a re-sampled signal (e.g., 72a, FIG. 2).

At block 148, a signal error associated with the re-sampled signal is computed, for example, by the filter adjustment processor 86 of FIG. 2. However, in accordance with the filter adjustment processors 86a, 86b of FIGS. 2A and 2B, in other embodiments, the computed error signal can be associated with a post-filtered signal (e.g., 80a-80N of FIG. 2A), or with a decoded signal (e.g., 82a-82N of FIG. 2B). Further details of the process of block 148 are described below in conjunction with FIG. 4.

At block 150, filter tap weight values, for example the tap weight values 96, 98 of FIG. 2, are identified in accordance with the computed signal error of block 148. At block 152 at least some of the filter tap weight values can be applied to a post filter, for example, to the post-filter 78 of FIG. 2. As described above, the filter tap weight values affect a magnitude and a phase response of the post-filter.

At block 154, the re-sampled signal is filtered with the post filter. However, in other arrangements, the pre-filtered signal generated at block 138 is filtered with the post-filter.

At block 156, at least some of the tap weight values generated at block 150 can be applied to a pre-filter, for example, to the pre-filter 62 of FIG. 2.

In other arrangements described above in conjunction with FIG. 2, at least one of the pre-filter 62 (FIG. 2) or the post-filter 78 (FIG. 2) is omitted, in which case the tap weight values are applied only to one filter, accordingly.

Referring now to FIG. 4, a method 160 provides further details of the block 148 of FIG. 3. The method 160 begins at block 162, where a signal characteristic is selected. As described above in conjunction with FIG. 2, the signal characteristic can be one or more of a variety of signal characteristics, including, but not limited to, a power spectrum of a portion of the re-sampled digital signal generated at block 146 of FIG. 3.

At block 164, the signal characteristic is measured, resulting, for example, in a power spectrum, having power spectrum values. As described above, and aspect of the measured power spectrum can be quantified in a variety of ways. In some embodiments, a shape of the measured power spectrum can be quantified. At block 166, an aspect of the measured signal characteristic, e.g., the power spectrum, is quantified.

At block 168 a signal error is computed in accordance with the quantified aspect (e.g., shape) of the measured signal characteristic (e.g., power spectrum) and in accordance with a comparable expected quantified aspect (e.g., shape) of the signal characteristic (e.g., power spectrum). The expected quantified aspect of the signal characteristic is a predetermined quantified aspect that would be expected if the signal received at block 132 of FIG. 3 had propagated through a perfect signal channel having no multipath, a flat magnitude response, and zero phase response before being received.

At block 170, the signal error is processed in order to provide the filter tap weight values at block 150 of FIG. 3.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of processing a signal to provide a channel characterization of a communication channel through which the signal is communicated, comprising:
  receiving the signal, wherein the signal comprises an encoded digital packet, wherein the digital packet includes packet data and a packet frame, wherein either one of, or both of, the packet data include or the packet frame includes a common digital signal that is common to each one of a plurality of digital packets, wherein the common digital signal is part of a native structure of the digital packet;
  sampling a signal representative of the received signal to provide a sampled signal;
  generating a predetermined replica signal prior to the receiving and prior to the sampling, wherein the predetermined replica signal is representative of the common digital signal, and wherein the predetermined replica signal is neither extracted from nor derived from the received signal or from the sampled signal;
  performing the channel characterization, wherein the performing the channel characterization comprises:
    replica correlating a signal representative of the sampled signal with the predetermined replica signal in a replica correlation, wherein the replica correlation is not an autocorrelation of the sampled signal with itself; and
    generating a measured signal characteristic value indicative of a characteristic of the communication channel in accordance with the replica correlation; and
  altering a filter characteristic of a filter in accordance with the measured signal characteristic value.

2. The method of claim 1, wherein the packet frame includes a start frame delimiter, and wherein the common digital signal includes at least a portion of the start frame delimiter.

3. The method of claim 1, wherein the packet frame includes a preamble having a plurality of alternating digital states, and wherein the common digital signal includes at least a portion of the preamble.

4. The method of claim 1, wherein the packet data include frame/protocol type data, and wherein the common digital signal includes at least a portion of the frame/protocol type data.

5. The method of claim 1, wherein the packet data include address data, and wherein the common digital signal includes at least a portion of the address data.

6. The method of claim 1, wherein the performing the channel characterization further comprises:
  generating a timing signal in response to a correlated signal resulting from the replica correlating;
  re-sampling the signal representative of the sampled signal in accordance with the timing signal to provide a re-sampled signal, wherein the generating the measured signal characteristic value comprises:
  measuring a signal characteristic of a signal representative of the re-sampled signal, wherein the method further comprises:
  quantifying an aspect of the measured signal characteristic; and
  computing a signal error in accordance with the quantified aspect of the measured signal characteristic and in accordance with an expected quantified aspect of the measured signal characteristic, and wherein the altering the filter characteristic comprises:
  generating filter tap weight values associated with the computed signal error; and
  applying the filter tap weight values to the filter to alter the characteristic of the filter.

7. The method of claim 6, Wherein the applying the filter tap weight values to the filter comprises at least one of:
  applying the filter tap weight values to a pre-filter configured to filter the sampled signal to provide a pre-filtered signal, or
  applying the filter tap weight values to a post filter configured to filter at least one of the signal representative of the sampled signal or the re-sampled signal to provide a post-filtered signal.

8. The method of claim 6, wherein the packet frame includes a start frame delimiter, and wherein the common digital signal includes at least a portion of the start frame delimiter.

9. The method of claim 6, wherein the packet frame includes a preamble having a plurality of alternating digital states, and wherein the common digital signal includes at least a portion of the preamble.

10. The method of claim 6, wherein the measured signal characteristic includes a power spectrum associated with the digital packet, wherein the quantified aspect of the measured signal characteristic includes a quantified shape of the power spectrum, and wherein the signal error includes a quantified shape error of the power spectrum.

11. A system for processing a signal to provide a channel characterization of a communication channel through which the signal is communicated, the system comprising:
  a receiving circuit coupled to receive the signal, wherein the signal comprises an encoded digital packet, wherein the digital packet includes packet data and a packet frame, wherein either one of, or both of, the packet data include or the packet frame includes a common digital signal that is common to each one of a plurality of digital packets, wherein the common digital signal is part of a native structure of the digital packet;
  a sampling circuit coupled to the receiving circuit, wherein the sampling circuit is configured to sample a signal representative of the received signal to generate a sampled signal;

a replica correlation processor coupled to the sampling circuit and configured to perform the channel characterization by replica correlating a signal representative of the sampled signal with a predetermined replica signal representative of the common digital signal in a replica correlation, wherein the predetermined replica signal is neither extracted from nor derived from the received signal or from the sampled signal, and wherein the replica correlation is not an autocorrelation of the sampled signal with itself;

a filter adjustment processor coupled to the replica correlation processor and configured to generate a measured signal characteristic value indicative of a characteristic of the communication channel in accordance with the replica correlation; and a filter coupled to the receiving circuit or to the sampling circuit, wherein a filter characteristic of the filter is altered in accordance with the measured signal characteristic value.

12. The system of claim 11, wherein the packet frame includes a start frame delimiter, and wherein the common digital signal includes at least a portion of the start frame delimiter.

13. The system of claim 11, wherein the packet frame includes a preamble having a plurality of alternating digital states, and wherein the common digital signal includes at least a portion of the preamble.

14. The system of claim 11, wherein the packet data include frame/protocol type data, and wherein the common digital signal includes at least a portion of the frame/protocol type data.

15. The system of claim 11, wherein the packet data include address data, and wherein the common digital signal includes at least a portion of the address data.

16. The system of claim 11, wherein the replica correlation processor is further configured to generate a timing signal in response to a correlated signal resulting from the replica correlating, wherein the system further comprises:

a re-sampling circuit coupled to the replica correlation processor and configured to re-sample the signal representative of the sampled signal in accordance with the timing signal, wherein the filter adjustment processor comprises:

a signal characteristic measurement processor coupled to the re-sampling circuit and configured to measure a signal characteristic of a signal representative of the re-sampled signal;

a quantification processor coupled to the signal characteristic measurement processor and configured to quantify an aspect of the measured signal characteristic;

an error processor coupled to the quantification processor and configured to compute a signal error in accordance with the quantified aspect of the measured signal characteristic and in accordance with an expected quantified aspect of the measured signal characteristic; and a filter tap generation processor coupled to the error processor and configured to identify filter tap weight values in accordance with the signal error, wherein the filter characteristic of the filter is altered in accordance with the filter tap weight values.

17. The system of claim 16, wherein the filter comprises at least one of:

a pre-filter coupled to receive the filter tap weight values and configured to pre-filter the sampled signal to provide a pre-filtered signal, or a post-filter coupled to receive the filter tap weight values and configured to post-filter at least one of the signal representative of the sampled signal or the re-sampled signal to provide a post-filtered signal.

18. The system of claim 16, wherein the packet frame includes a start frame delimiter, wherein the common digital signal includes at least a portion of the start frame delimiter.

19. The system of claim 16, wherein the packet frame includes a preamble having a plurality of alternating digital states, and wherein the common digital signal includes at least a portion of the preamble.

20. The system of claim 16, wherein the measured signal characteristic includes a power spectrum associated with the digital packet, wherein the quantified aspect of the measured signal characteristic includes a quantified shape of the power spectrum, and wherein the signal error includes a quantified shape error of the power spectrum.

* * * * *